United States Patent [19]

Weng et al.

[11] Patent Number: 5,405,692
[45] Date of Patent: Apr. 11, 1995

[54] TAMPER-EVIDENT PRESSURE SENSITIVE FACESTOCK LABELS

[75] Inventors: Tung Y. Weng; Carl D. Ray, both of Terre Haute, Ind.

[73] Assignee: Tredegar Industries, Inc., Richmond, Va.

[21] Appl. No.: 178,924

[22] Filed: Jan. 7, 1994

Related U.S. Application Data

[62] Division of Ser. No. 887,319, May 22, 1992, Pat. No. 5,277,971.

[51] Int. Cl.⁶ .................. B32B 7/12; C08L 33/06
[52] U.S. Cl. .................. 428/343; 428/516; 428/517; 428/916; 428/141; 525/227; 525/240; 525/931
[58] Field of Search .......... 428/516, 40, 517, 343; 525/227, 240, 931

[56] References Cited

U.S. PATENT DOCUMENTS

| | | | |
|---|---|---|---|
| 3,234,313 | 2/1966 | Miller et al. | 525/931 |
| 3,299,181 | 1/1967 | Coover et al. | 525/227 |
| 3,350,372 | 10/1967 | Anspon et al. | 525/227 |
| 3,957,414 | 5/1976 | Bussey, Jr. | 425/384 |
| 4,121,003 | 10/1978 | Williams | 428/40 |
| 4,503,123 | 3/1985 | Ou-Yang | 525/227 |
| 4,579,912 | 4/1986 | Canterino et al. | 525/931 X |
| 4,690,976 | 9/1987 | Hahnfeld | 525/931 X |
| 4,716,201 | 12/1987 | Canterino et al. | 525/931 X |
| 4,740,427 | 4/1988 | Ochiumi et al. | 525/240 X |
| 4,876,123 | 10/1989 | Rivera et al. | 428/34.2 |
| 4,910,254 | 3/1990 | Johnston | 525/931 X |
| 4,931,327 | 6/1990 | Liu et al. | 428/36.5 |
| 4,957,679 | 9/1990 | Moore | 525/240 X |
| 5,013,088 | 5/1991 | Martin | 283/81 |
| 5,051,297 | 9/1991 | Reich et al. | 525/227 |
| 5,151,309 | 9/1992 | Dollinger | 428/516 |
| 5,277,971 | 1/1994 | Weng et al. | 428/343 |

OTHER PUBLICATIONS

Flexcon Product Information, TAMPERmark ™ PE-200-W Destruct V-88 90 PFW, Flexcon Company, Inc., Flexcon Industrial Park, Spencer, Mass. 01562-2642, pp. 1-4.

Flexcon Product Information, THERMLfilm ™ PE-200-W Destruct T/C-387 V-88 S50K-7, Flexcon Company, Inc., Flexcon Industrial Park, Spencer, Mass. 01562-2642, pp. 1-4.

Tampermark PE 200 White Destruct TC-391, V-88 Spec 50K-7, Flexcon Label.

Flexcon product product brochure, pp. 1-2, Scan-Tech Times, Philadelphia Oct. 19-21, 1993.

Label Security publicity release for Flexcon fibers. Converting Magazine, Jan. 1992, p. 61 (Packaging).

*Primary Examiner*—George F. Lesmes
*Assistant Examiner*—Blaine R. Copenheaver
*Attorney, Agent, or Firm*—Emch, Schaffer, Schaub & Porcello Co.

[57] ABSTRACT

A film useful in tamper-evident pressure sensitive label applications comprises a blend of incompatible polymers wherein the film is melt extrusion cast and has a cohesive strength less than the adhesive strength of an adhesive material bonded to one surface of the film. The adhesive material has an adhesive strength greater than the cohesive strength of the film so that when the tamper-evident pressure sensitive label has been adhered to a substrate attempted tampering or removal of the label causes at least partial destruction of the film.

13 Claims, 6 Drawing Sheets

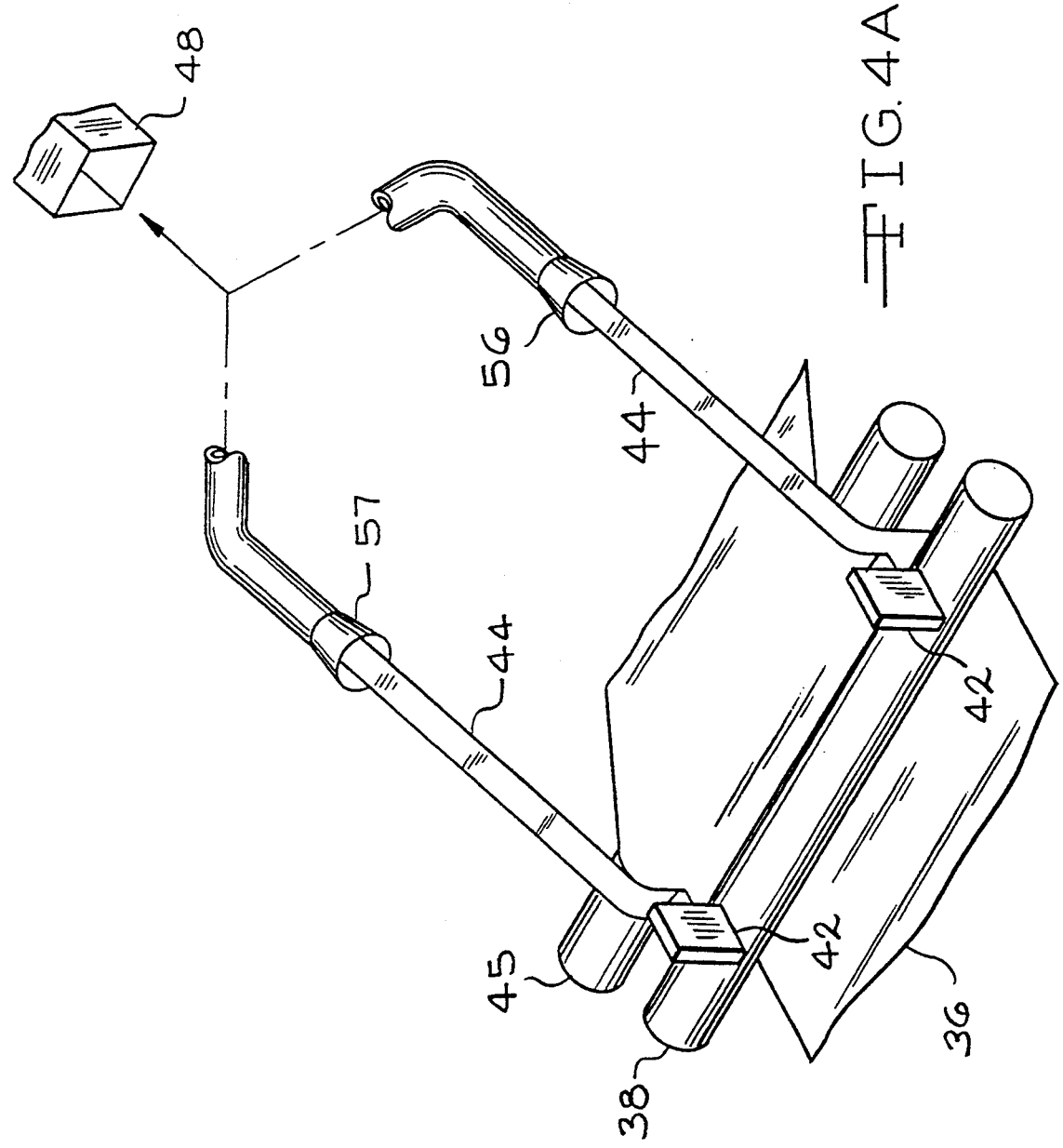

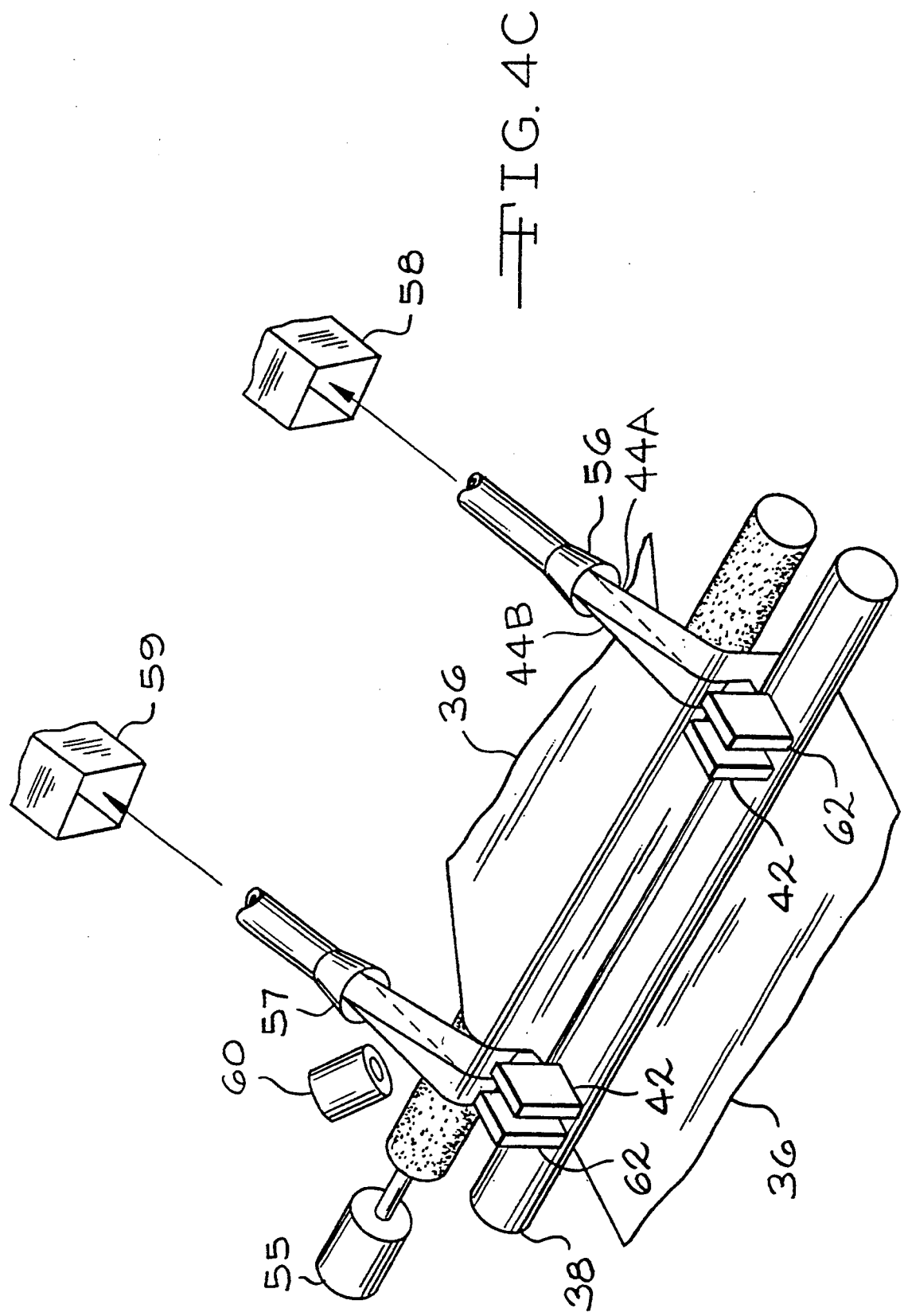

TAMPER-EVIDENT PRESSURE SENSITIVE FACESTOCK LABELS

This is a divisional of application Ser. No. 07/887,319, filed on May 22, 1992, now U.S. Pat. No. 5,277,971, issued Jan. 11, 1994.

TECHNICAL FIELD

This invention relates to films and in particular to films useful in making labels which readily disintegrate upon any evidence of tampering.

BACKGROUND

The present invention is directed to tamper-evident, pressure sensitive facestock labels which are useful on a wide variety of substrates including for example, stainless steel, aluminum, paper, paper-like products and plastics, such as polyethylene.

Pressure sensitive labels consist basically of three components: a release liner, a pressure sensitive adhesive and a facestock material or actual label. The facestock label is printed on one side with the intended decoration design or message, while the opposite side of the label is coated with the designated pressure sensitive adhesive material. The function of the release liner is to protect the adhesive, act as a die-cutting base and carry the face stock label through a converting process. Pressure sensitive labels are subjected to various converting processes or steps during their manufacture and use. The major converting processes include (1) coating one side of the release liner with a pressure sensitive adhesive, (2) laminating the release liner to the facestock material, (3) printing on the facestock side of the label, (4) die-cutting the facestock material, and (5) applying the facestock label to the surface of an end use product, often known as label dispensing and application.

There have been many efforts to provide tamper-evident materials for application to packages for pharmaceutical and foodstuff products. In addition, various types of labels disintegrate or show evidence of tampering if the label is removed from the substrate.

The U.S. Pat. No. 5,013,088 to Marin discloses disintegratable masking labels which have a plurality of cuts in the label such that upon tampering, portions of the label remain bonded to the substrate and the remaining label fragments show evidence of tampering of the label.

The U.S. Pat. No. 4,931,327 to Liu et al. discloses a tamper evident film comprising a core layer and at least one oriented tamper-evident layer applied to the core layer. The tamper-evident layer comprises a mixture of a polyolefin and filler or particles which induce cavitation upon orientation of the film. An oriented skin layer is applied to the core layer if tamper-evident layers have not previously been applied to both sides of the core layer.

The U.S. Pat. No. 4,876,123 to Rivera et al. discloses a tamper indicating tape including a delaminating film which delaminates internally between first and second major surfaces. The tamper indicating tape also includes colored indicia printed on the major surfaces of the film and an adhesive means for adhering the film to a substrate.

The U.S. Pat. No. 4,121,003 to Williams discloses tamper indicating labels comprising a laminate of a transparent outer sheet having a tamper-indicated, information-containing pattern printed on its inner surface and a pressure sensitive adhesive film coated on the printed inner surface of the outer sheet.

In addition, various types of tamper-evident labels are made from polyvinylchloride and cellulose acetate materials. Typically, these tamper-evident films are made using a solution casting process. The solution casting of polyvinylchloride and/or cellulose acetate film is expensive and complicated and requires extensive handling of the solvent. A polyvinylchloride and/or cellulose acetate material is dissolved in a suitable solvent and thereafter spread out over drums, belts, coated papers or the like to evaporate the solvents. Upon evaporation of the solvent, the solute loses its flexibility and eventually becomes very rigid and brittle. The rigid, brittle material is easily susceptible to destruction if any external mechanical stresses are exerted.

Until the present invention it has not been possible to use melt extrusion processes, blown or cast, for producing brittle type films. In a typical cast extrusion process the film undergoes tension and stress and is subject to movement and vibrations of the processing equipment which causes the film to shatter or fracture.

Therefore, it is an object of the present invention to provide a tamper-evident pressure sensitive coated facestock label which provides visible evidence that tampering has occurred.

It is a further object of the present invention to provide tamper-evident pressure sensitive coated facestock labels which can be applied on diverse types of substrates such as metals, plastics, paper, paper-like products and the like.

It is still a further object of the present invention to provide a tamper-evident pressure sensitive coated facestock label which readily disintegrates upon removal of the label from a substrate.

It is an additional object of the present invention to provide a tamper-evident pressure sensitive label which does not involve the use of solvents during the manufacturing process of the label.

It is an additional object of the present invention to provide a tamper-evident pressure sensitive label which can be produced using a cast extrusion process.

It is still an additional object of the present invention to provide a method for producing a tamper-evident pressure sensitive label by cast extrusion.

DISCLOSURE OF INVENTION

The present invention provides a tamper-evident, pressure sensitive coated facestock label having the required destructive brittleness or destructibility needed to show evidence of tampering. The pressure sensitive coated facestock label includes a film comprised of a blend of two incompatible polymeric systems. The first polymeric system comprises a polymer which can be processed into a readily handleable film. The second polymeric system comprises a polymer which is normally too brittle to be processed into a film using a melt extrusion process.

Until the present invention, it was not possible to melt extrude a brittle film. According to the present invention, the film can surprisingly be made using a melt extrusion casting process and does not require the use of any solvents during the film manufacturing process. The film of the present invention can be made such that one side is matte embossed and the other side is smooth or glossy. The smooth side provides a good surface for most types of label printing applications and for applications requiring good image transfer such as a thermal transfer printing coating, for example applying barcode data. The film can be converted to a pressure sensitive coated facestock label using pressure sensitive coating and lamination equipment. A suitable adhesive material is applied to the film to form the tamper-evident pressure sensitive coated facestock label.

BRIEF DESCRIPTION OF THE DRAWINGS

FIG. 4A is a schematic diagram shown in perspective of a portion of a ribbon removal system.

FIG. 4C is a schematic diagram shown in perspective of one embodiment of a portion of a ribbon removal system according to the present invention.

BEST MODE FOR CARRYING OUT INVENTION

Figure 1A:
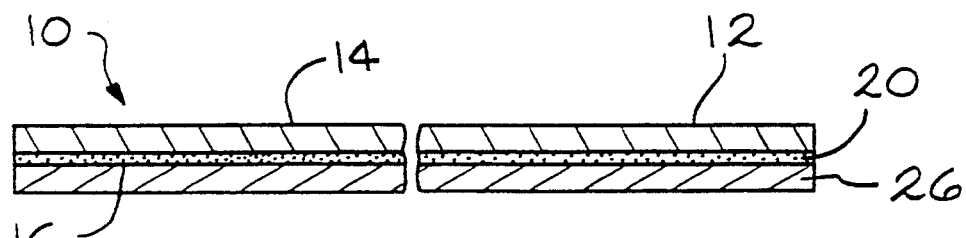
FIG. 1A is a cross-sectional schematic representation of one embodiment of the label of the present invention with a release liner in place.

Referring now to the drawings, there is shown in FIGS. 1A, 1B and 2A, 2B, a tamper-evident, pressure sensitive label according to the present invention and generally designated by the reference numeral 10. The label generally includes a film 12 having an upper surface 14 and a lower surface 16 and an adhesive layer 20. The film comprises a composition of a blend of two incompatible polymeric systems. The film has desirable poor physical properties such that the film readily destructs or tears upon attempted removal from a substrate 24. The adhesive material 20 is applied to the lower surface 16 of the blended film. The desired information can be printed on the top surface 14 of the film 12. Depending upon the desired characteristics of the label, the top surface can either have a matte or smooth or glossy surface. The smooth side of the film provides a good surface for most types of label printing applications. Most printing applications require a good image transfer such as in thermal transfer printing used for barcoding applications. Various types of printing inks or material are useful with the film of the present invention. The exact chemical composition of the printing material depends upon the end use application and various known printing materials can be employed as are known in the art. Again, depending upon the end use application, the printed material may be applied to the film after application of an adhesive material thereto.

Figure 1B:
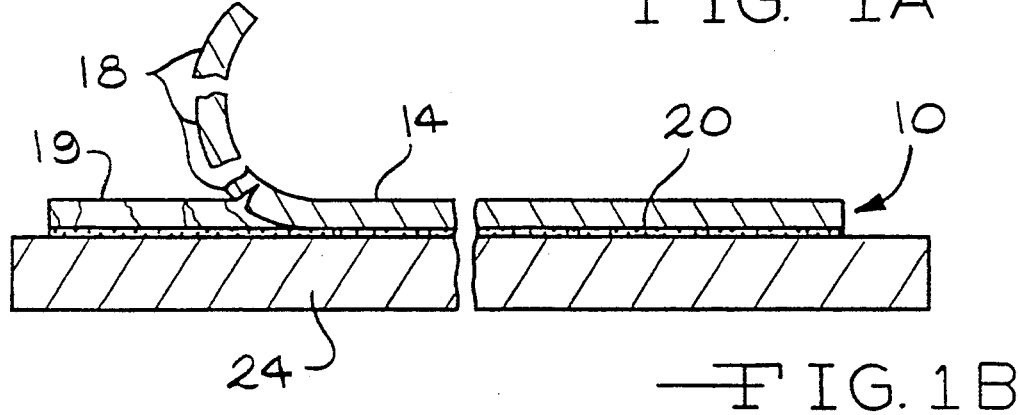
FIG. 1B is a cross-sectional schematic representation of the label shown in FIG. 1A after application to a substrate and attempted removal of the label.

The adhesive material used depends upon the end use application and which type of substrate material the label will be applied to. The adhesive material has an adhesive strength such that when the label is attempted to be removed from the substrate the adhesive material readily allows the film material to tear. In one preferred embodiment the adhesive material comprises a strong acrylic or rubber-based pressure sensitive adhesive system. In accordance with the present invention, the adhesive bond strength of the adhesive material is greater than the internal cohesive strength of the film. Thus, when a mechanical stress is applied to the tamper-evident label, the film tears or is destructed such that, while a portion of the label can be removed, the remaining portion remains adhered to the substrate. As a result of this destruction, the label is incapable of being reapplied or resealed without showing evidence of tampering thereof. As such, an adhesive material is selected so that the adhesive material possesses the desired adhesive bond strength to bond the film to the substrate. Thus, labels applied to such surfaces as a plastic molded computer housing may require a different adhesive strength than labels to be applied to other surfaces such as stainless steel, aluminum or other type of smooth surface. It is noted that, in various end use applications, at least a portion of the adhesive material may remain adhered to the substrate upon the attempted removal of the label from the substrate. The adhesive material has a greater adhesive strength than the cohesive strength of the film material such that the film material readily tears or breaks due to its poor physical properties. Thus, as can be seen in FIG. 1B, a portion 18 of the film 12 can be detached from the substrate 24 such that a remaining portion 19 of the film 12 remains adhered to the substrate 24.

Figure 2A:
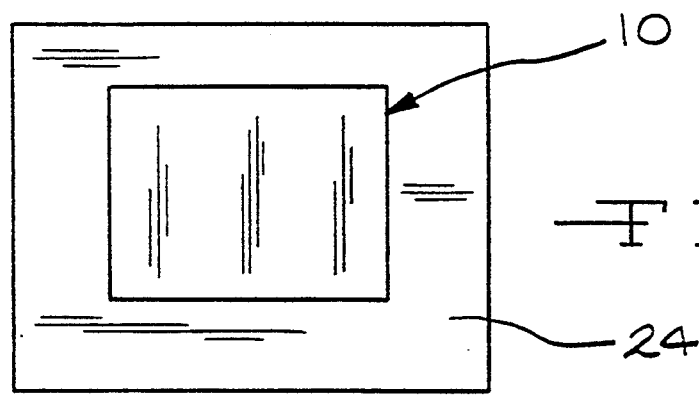
FIG. 2A is a top view of one embodiment of a label of the present invention applied to a substrate.
Figure 2B:
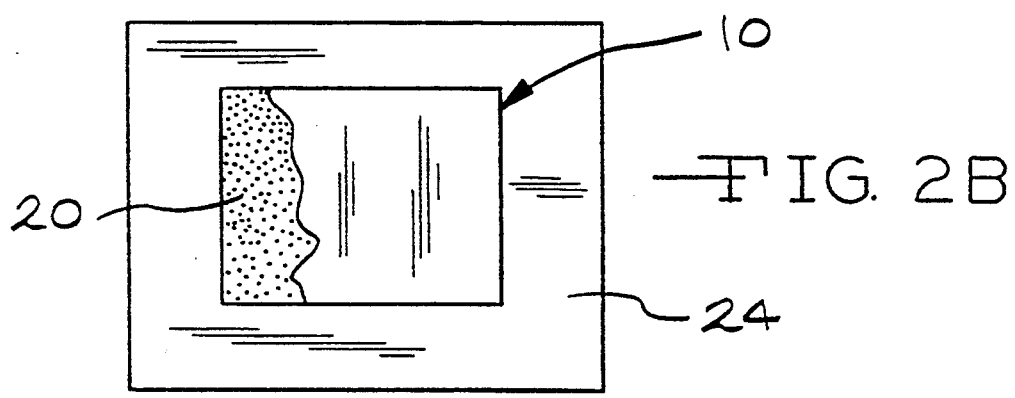
FIG. 2B is a top view of the label shown in FIG. 2A after attempted removal from the substrate.

As can be further seen in FIGS. 2A and 2B, a label 10 is applied to a substrate 24. Upon attempted removal thereof, as shown in FIG. 2B, the label 10 tears due to its brittleness or easily destructible physical properties. In certain embodiments, the adhesive material 20 can remain adhered to the substrate 24.

The thickness of the film and the thickness of the adhesive material depend upon the properties desired for a particular end use label application. Typically, the film can have a thickness of between about 1.0 mil. and about 5 mils, while the adhesive material be applied to a thickness between about 0.5 mils and about 1.0 mils.

Referring again to FIG. 1A, the label 10 can be temporarily adhered to a release liner 26 so that the label can be easily formed. Various types of release liners including for example, a silicon coated paper or film can be utilized in the present invention. The release liner 26 is selected such that the label can be readily removed therefrom and yet the label remains adhered thereto during any storage or shipment of the labels. The adhesive bond strength between the adhesive material 20 and the release liner 26 is lower than the adhesive bond strength between the adhesive material 20 and the film 12 such that the release liner 26 can be readily peeled from the adhesive material 20 and the film 12 does not tear or destruct upon removable from the release liner 26.

The film of the present invention comprises a blend of two or more incompatible polymers. The first polymer comprises a polymer which can be made into a readily handleable film using a melt extrusion process. The second polymer comprises a brittle polymer which cannot be melt extrusion cast or processed by itself into a film. When a brittle polymer (such as polystyrene or the like) is blended with an incompatible, but readily processable or handleable polymer, a film can be produced using a melt extrusion process. The film comprises a blend of the readily handleable first polymer and incompatible brittle second polymer wherein there are weak interphase boundaries between the first polymer and the second polymer. It is believed that the presence of these weak boundaries allows the film to have brittle or "poor" physical properties. These "poor" physical properties, which include low elongation, and tensile strength, allow the film to be readily torn or destructed. The film readily tears in both the transverse and machine directions. The film is sufficiently brittle to be useful in tamper-evident applications and yet has enough strength to be initially cast and processed using a melt extrusion process. The film also has sufficient strength to be further processed into a label using pressure-sensitive coating and laminating processes.

The first polymer includes from about 40% to about 70%, by weight, of at least one polymer such as polyolefin, including for example, polyethylene (including low, medium and high density polyethylene), polypropylene, copolymers of polyethylene, copolymers of polypropylene and the like; blends of the above polymers and the like. In certain embodiments, the first polymer comprises about 50% to about 70%, by weight, high density polyethylene having a density of about 0.94 to about 0.965 g/cc. and in other embodiments, the first polymer comprises about 60% to about 70%, by weight, high density polyethylene.

The second polymer includes from about 30% to about 60%, by weight, of at least one stiff or brittle type polymer including, for example, from such polymers as polystyrene, polymethylmethacrylate, blends thereof and the like. In one embodiment of the present invention, the second polymer comprises about 30% to about 60%, by weight, polystyrene. In certain embodiments, the second polymer comprises about 30% to about 50%, by weight, polystyrene and in other embodiments about 30% to about 40%, by weight, polystyrene.

The film made according to the present invention can be natural or white in color. It is also within the contemplated scope of the present invention that various other additives and fillers known in the industry can be added to the film. In addition, colorants can be added to the film to impart the desired color.

The film produced according to the present invention can be processed into pressure sensitive labels and can receive suitable pressure sensitive adhesives. The film can be corona treated, as is known in the art, such that the surfaces of the film readily accept any printing ink or a top coating and readily receive any pressure sensitive adhesive materials. The film of the present invention can be produced having a matte finish on one side of the film and a smooth or glossy finish on the other side of the film. It is contemplated that the smooth side of the film can have a smoothness in the range of about 0.25 to about 10 Ra. This connection Ra is defined as the arithmetic average height of the micro peaks to the centerline of a particular finish surface, as measured by a profilometer. This measurement is usually expressed in $10^{-6}$ microinches. The one-side matte label of the present invention can be printed upon either the matte finish side or the smooth finish side. Thus, the one-side matte film provides the label manufacturer with greater versatility. In addition, the label manufacturers need only stock one type of film, thereby decreasing film inventory and complications of logistics and production methods.

The same "poor" physical property characteristics which make the film especially useful in tamper-evident applications, provide problems when manufacturing such film. Surprisingly, the film of the present invention can be made using a melt extrusion process. The film of the present invention may be preferably produced by dry blending the first and second polymers together. The blended polymers are then cast using a melt extrusion process.

Figure 3A:
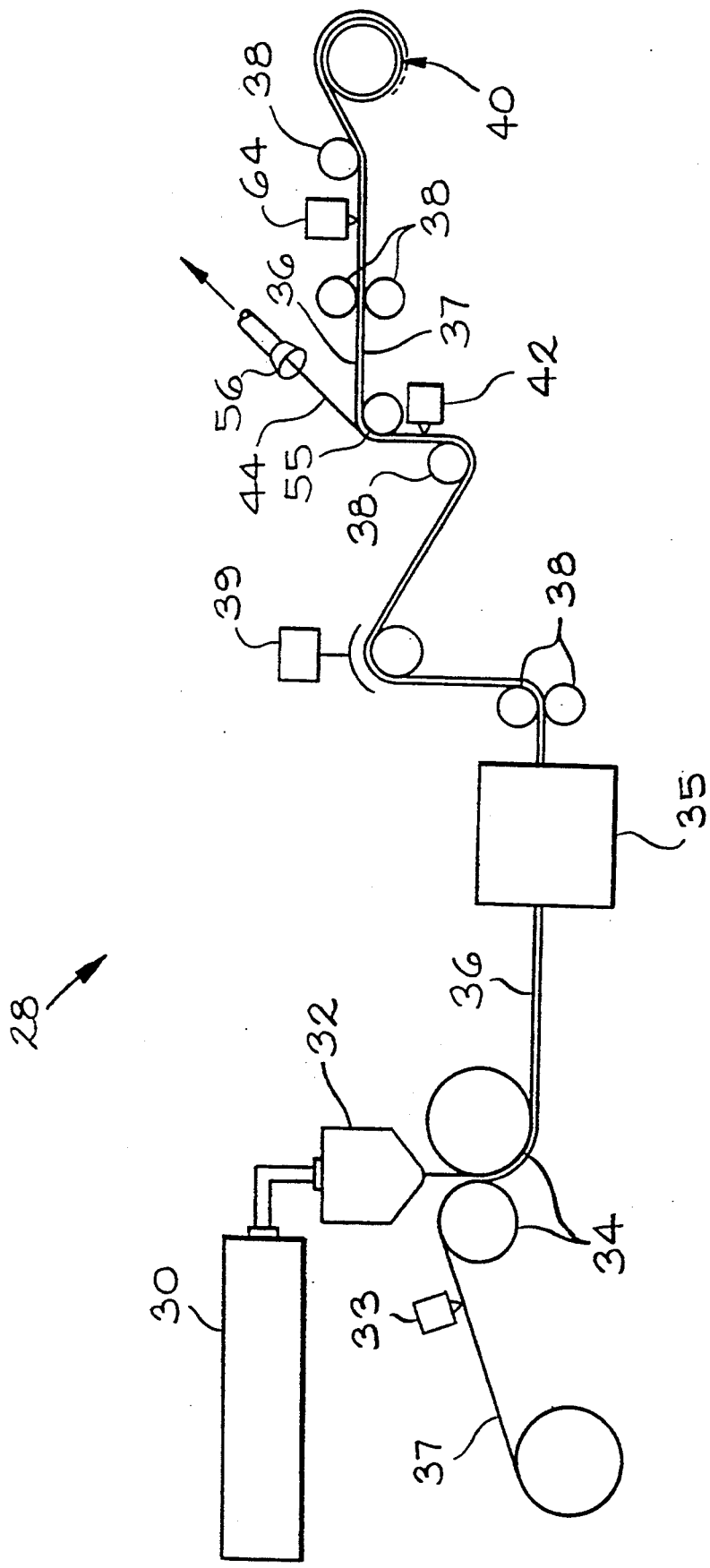
FIG. 3A is a schematic diagram showing a side elevation of one side of a cast extrusion equipment at an early stage of producing film.
Figure 3B:
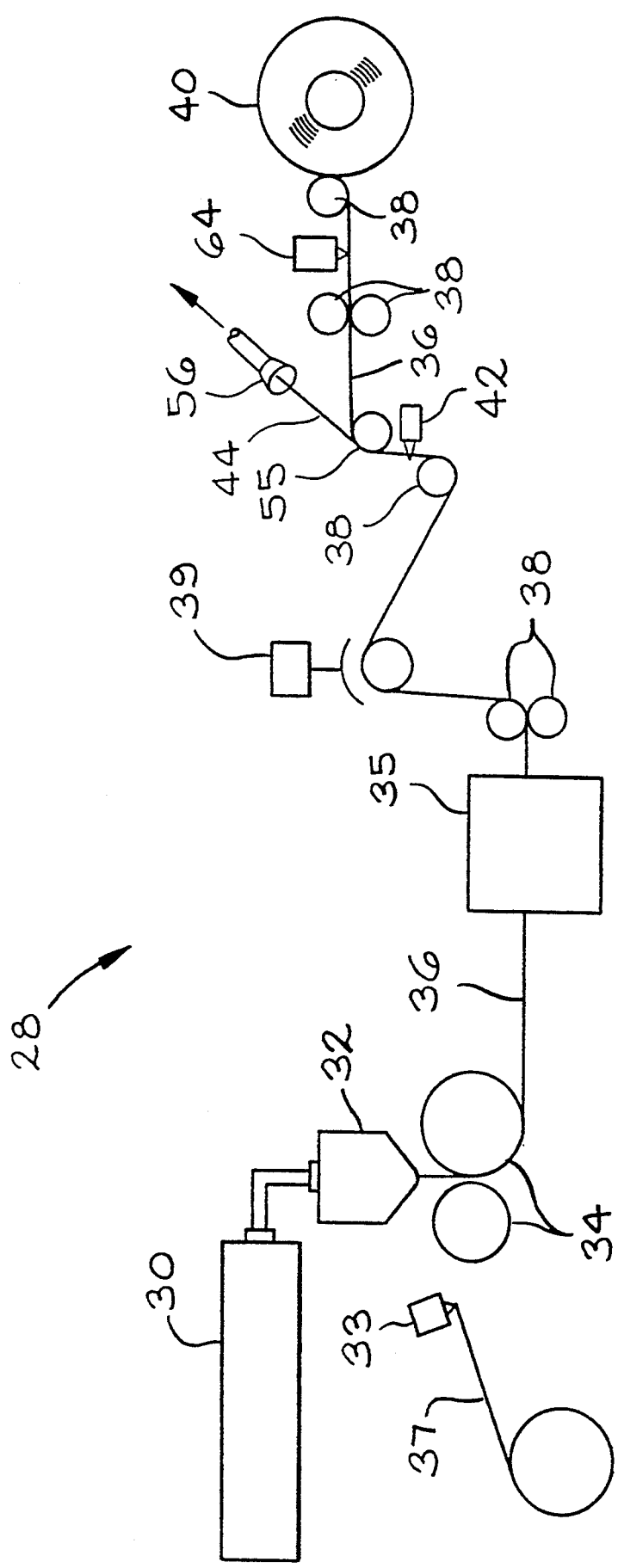
FIG. 3B is a schematic diagram showing a side elevation of one side of cast extrusion equipment at a later stage of producing film.

A schematic diagram showing suitable film extrusion equipment 28 for producing the film of the present invention is shown in FIGS. 3A and 3B. The polymers are blended together with other, optional ingredients (not shown) and fed into an extruder 30. The blended polymers are extruded from the extruder 30 to a die 32. The extruded polymer is cast into nip rolls 34 which form an embossed film 36. The film 36 passes through a gage 35 and a film treater assembly 39 which provides a corona treatment to the film 36. The film 36 is advanced through the film extrusion equipment by a plurality of rolls 38 to a winder assembly 40.

Lateral or outer edges ("ribbons") 44 of the film 36 are trimmed from the extruded film during the film extrusion process by slitters or blades 42. These ribbons 44, are recycled back (not shown) into the extruder 30.

In a typical film cast extrusion process the film is extruded from the die 32 and passed or laced through the different rolls 38 until the film is wound using the winder assembly 40. However, since the film of the present invention is very brittle, it is difficult and time consuming to lace the film through the film extrusion equipment. The film tends to break into pieces if any pulling forces are exerted on the film.

During the initial start-up of the process for producing the film of the present invention the film 36 is laced through the film extrusion equipment using a carrier or lace-up film 37, as seen in FIG. 3A. The carrier film 37 is fed through the nip rolls 34 prior to or with a leading edge (not shown) of the film 36 being extruded from the die 32. The film 36 and the carrier film 37 are in contact. The carrier film 37 aids in carrying or holding the film 36 as it is initially fed or laced through the film extrusion equipment such that no damage, cracking or breaking of the film 36 occurs.

The carrier film 37 carries the leading edge (not shown) of the film 36 to the winder assembly 40. After the leading edge of the film 36 and carrier film 37 are laced through the extrusion equipment, the carrier film 37 is then cut with a blade 33, as seen in FIG. 3B to leave only the film 36 running through the film extrusion equipment. In certain embodiments a portion of the carrier film 37 is wound by the winder assembly 40 on a roll along with the film 36. The result is that the film 36 then proceeds through the film extrusion equipment. Suitable carrier films are those films which are flexible and have suitable strength. For example, polyethylene films and low density polyethylene films are flexible, tough and are examples of a film useful to lace through film extrusion equipment.

FIG. 4A shows a portion of a ribbon removal system wherein the lateral edges or ribbons 44 of the film 36 are cut by razor-like blades 42 to achieve the desired film width. The ribbons 44 are passed over an idler roller 45 which is driven by the ribbons 44. Ribbon suction tubes 46 and 47, which are spaced apart from the idler roll 45 receive the ribbons 44 from each edge of the film 36. As can be seen in FIG. 4A, the ribbons 44 pass over an idler roll 45 across a distance of at least a couple of feet or more to the suction tubes 46 and 47. The ribbon suction tubes 46 and 47 typically have a relatively large diameter of approximately 4 inches or more. The ribbon suction tubes 46 and 47 are attached to a blower assembly 48 which vacuums or sucks the ribbons 44 and returns (not shown) the ribbon 44 to the extruder 30.

However, when the brittle films of the present invention are cut, the areas where the ribbon cutting blades are inserted constitute highly concentrated stress points or very weak points. The ribbon removal system described above is unable to efficiently remove the ribbons being generated from the film 36 thus causing back-up of the ribbon in the suction tubes which then causes film breakage. This problem is further compounded by the paper-like nature of the film 36 which causes the ribbons to drag very slowly or even stop completely in the suction tubes (not shown).

Figure 4B:
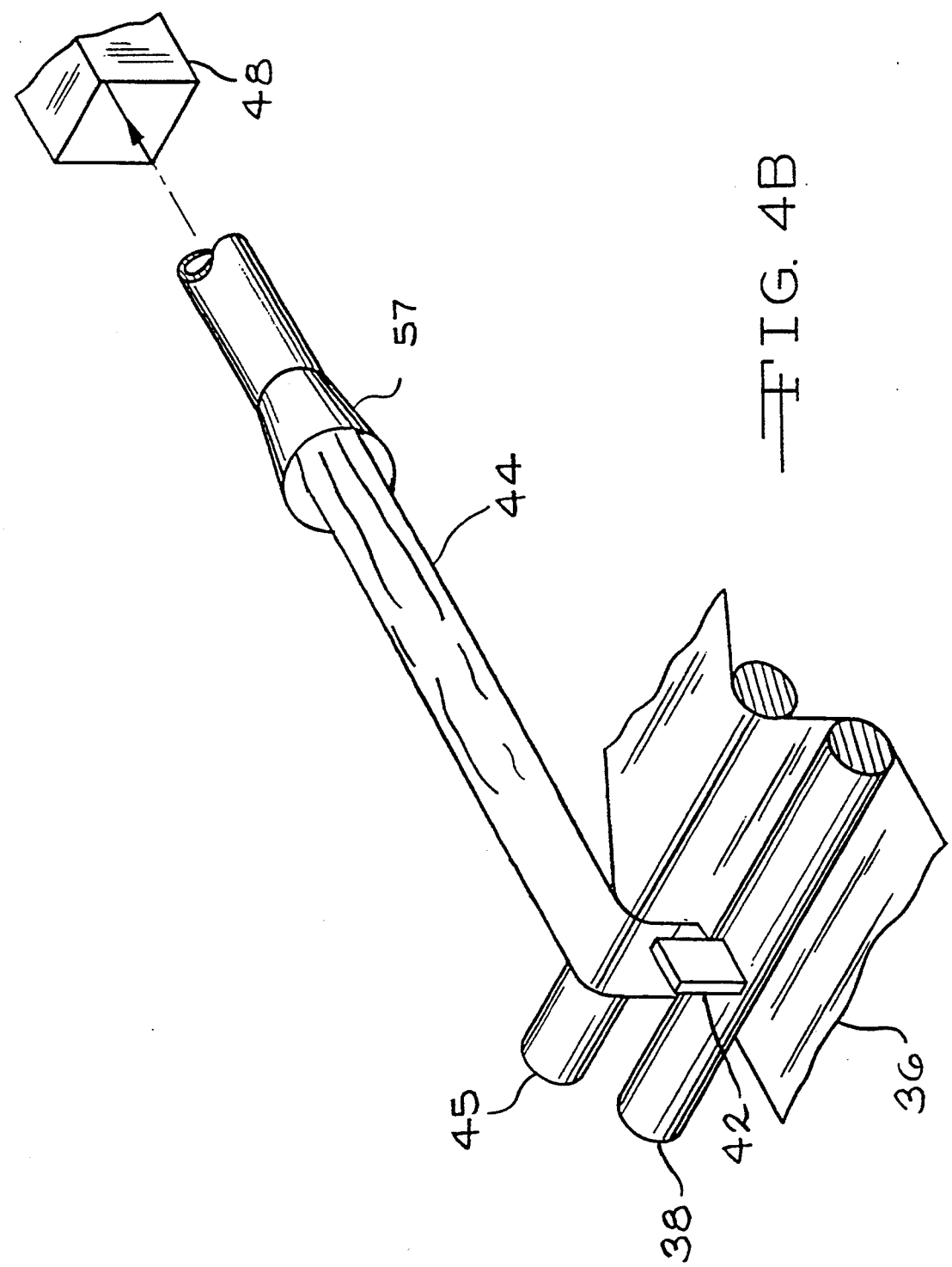
FIG. 4B is a schematic diagram shown in perspective of a portion of a ribbon removal system.

In addition, during the extrusion of the film, the winder assembly 40 oscillates laterally in order to produce a uniform roll conformation (not shown). The oscillation levels out any gage variations in the film. As the film web oscillates laterally (not shown) the ribbon 44 becomes narrower on one side of the film and wider on the other side. During cast extrusion processes with films which are flexible, the films will fold and bend such that a ribbon which is wider than the opening of the suction tube will enter the tube without problems. However, the brittle film of the present invention will not bend or fold without causing problems since there is high friction between the brittle or paper-like nature of the film 36 and the walls of the suction tubes. Thus, as seen in FIG. 4B, when the oscillation causes the ribbon width to exceed the opening of suction tube 47, the ribbon 44 wrinkles. The film 36 is cut into ribbons 44 in the machine direction. Due to the nature of the blend and orientation of the film, the film is weaker in the transverse direction than in the machine direction. When the blades 42 cut the film in the machine direction the ribbons 44 easily separate from the film 36. The points of initiation where the ribbons are cut by the blades 42 are areas of high stress on the film and the film is subject to cracking or breaking at that point. In addition, the ribbons 44 being cut tend to slightly vibrate close to the blades 42 if the blower assembly 48 does not remove or vacuum the ribbons 44 efficiently and at a constant tension. These vibrations cause slack or bagginess in the ribbons 44. Slack in the ribbons 44 at the points where the blades 42 cut the ribbons 44 causes the film to break. These problems are compounded by the facts that the ribbons 44 are made of a stiff or brittle material and that the width of the ribbons 44 varies as the film 36 is being made.

It has been found that it is not a solution to widen the width of the suction tube opening to accommodate the corresponding width of the ribbon being generated by the oscillating winder assembly 40. High velocity air requirements are necessary in order to move the ribbons through the suction tubes, and it is necessary that the openings of the suction tubes be narrow in order to maintain the high velocities required to remove the ribbons at an appropriate rate. A larger opening of the air inlet on the suction tube will reduce the velocities and creates the aforementioned difficulties.

The inventors have surprisingly found a way to overcome the ribbon handling problems by maintaining constant tension on the ribbons, thereby preventing film breakage. According to the present invention, it is possible to remove the ribbons in a manner such that the film does not break.

Referring now to FIG. 4C, the film web 36 is passed over a roll 38 and is cut by the slitter blades 42. The film 36 and ribbons 44 are pulled by a driven roll 55. In certain embodiments it is preferred that the surface of the driven roll 55 have a "rubber" type surface in order to better pull or carry the film 36 and ribbons 44. Suction tubes 56 and 57 are adjacent the driven roll 55 and, in certain embodiments, the tubes 56 and 57 are a few inches from the driven roll 55. Thereafter, each suction tube 56 and 57 is individually connected to blower assemblies 58 and 59, respectively. It is advantageous to provide an individual blower connected to each suction tube. It is also advantageous to provide suction tubes with a small diameter in order to achieve a higher air velocity moving through the suction tubes. The higher air velocity keeps the ribbons moving through the tubes and prevents the ribbons from dragging or becoming stuck in the tubes. As the ribbon 44 is being removed by the suction tubes 56 and 57 the rate of suction from the blower assemblies 58 and 59 can be adjusted to remove the ribbons 44 at a rate of speed which controls tension on ribbons and prevents any bagginess or slack in the ribbons. In addition, the driven roll 55 aids in maintaining the appropriate tension on the ribbon 44. It has further been found that when the tubes 56 and 57 are positioned close to or adjacent the driven roll 55, there is less tension on and vibration of the moving ribbons. Thus, the removal of the ribbon at a preferred rate of speed allows the tension on the ribbons to be adjusted so that no breakage occurs to the extruded film.

In addition, an electric eye system 60 can be used which senses the ribbon width. When the width of the ribbon exceeds a predetermined width, the electric eye system 60 is triggered (by sensing the excess ribbon width). The electric eye system 60 sends a signal to activate second slitter blades 62. The second blades 62 cut the ribbon into two portions, 44A and 44B. What would have been, for example, a wide ribbon trying to crumple itself into a narrow opening, now becomes two narrower ribbons 44A and 44B which can overlap and fit into the opening of the suction tube without causing problems.

Referring again to FIGS. 3A and 3B, when a target length of film is collected on one roll, a new roll of film is needed. This change in rolls is called indexing. During the indexing step, the winder assembly 40 rotates the film, and a large knife 64 is engaged to cut a trailing edge (not shown) of the film. The winder assembly 40 typically exerts high tension forces on the film to prevent any bagginess in the film during indexing. However, since film of the present invention is brittle and is not very elastic, this mode of indexing causes the film to break. In addition, vibrations and movements occur during the movement and rotation of the winder assembly and cutting action of the knife. All these strong vibrations can also cause the film web to break. However, the inventors have surprisingly found that in order to overcome these problems, the winder assembly can be adjusted to put less tension on the film as it is being indexed. The reduced tension on the film allows the trailing edge of the film to be cut without causing the film to break.

The film of the present invention has transverse direction (TD) fracture characteristics which are different from the fracture characteristics in the machine direction (MD). In the TD, the film fractures in a zigzag-like manner. In the MD, the fracture propagates in a sharp, clean and straight-like path. It is believed that these fracture characteristics are due to the blend morphology and orientation effects induced during cast extrusion of the film. The film of the present invention exhibits sufficient strength such that conventional top finish or pressure sensitive adhesive coating methods may be utilized to apply the adhesive thereto. Thereafter, the adhesive coated film can be laminated to the pressure sensitive methods may be utilized to apply the adhesive thereto. Thereafter, the adhesive coated film can be laminated to the pressure sensitive release liner without damage due to breaking or cracking of the film.

INDUSTRIAL APPLICABILITY

The following examples illustrate the present invention. In all examples the tamper-evident pressure sensitive labels made according to the present invention were tested for destructibility.

EXAMPLE #1

A one-side matte extruded cast film was made as described above, and comprised about 60% high density polyethylene and 40% polystyrene (weight %). The physical properties of the film follow, where MD is the machine direction and TD is the transverse direction:

| "Thickness by weight" Gauge (mils): | | 2.18 |
|---|---|---|
| Tensile strength (lbs) | MD: | 1.01 |
| | TD: | 0.59 |
| Elongation (%) | MD: | 5.05 |
| | TD: | 2.95 |

Above film was coated with a strong pressure sensitive adhesive material to form labels. Thereafter, the labels were applied on different substrates and tested for their destructibility or brittleness after different pre-set times: immediately, 1 minute, 15 minutes, 1 hour, 24 hours. Destructibility was scaled from 1 to 5; 1 being not destructible and 5 being completely destructible. The following results were obtained:

| Substrate | Immediately | 1 min. | 15 min. |
|---|---|---|---|
| Stainless steel | 4 | 4 | 4 |
| Aluminum | 3 | 4 | 3 |
| Polyethylene | 3 | 4 | 3 |
| Stainless steel | 4 | 4 | |
| Aluminum | 4 | 4 | |
| Polyethylene | 4 | 4 | |

EXAMPLE #2

A one-side matte extruded cast film was made of the following: about 50% high density polyethylene and 50% polystyrene (weight %), yielded the following physical properties:

| "Thickness by weight' Gauge (mils): | | 2.12 |
|---|---|---|
| Tensile strength (lbs) | MD: | 1.11 |
| | TD: | 1.29 |
| Elongation (%) | MD: | 5.55 |
| | TD: | 6.47 |

In a manner similar to Example #1, the above film was coated with a strong pressure sensitive adhesive material to form labels which were tested for destructibility. The following results were obtained:

| Substrate | Immediately | 1 min. | 15 min. |
|---|---|---|---|
| Stainless steel | 4 | 4 | 4 |
| Aluminum | 4 | 3 | 4 |
| Polyethylene | 4 | 4 | 4 |
| | 1 hour | 24 hours | |
| Stainless steel | 4 | 4.5 | |
| Aluminum | 4 | 4.5 | |
| Polyethylene | 4 | 4.5 | |

As can be seen from the above Examples 1 and 2, minimal self-integrity of the label film is achieved. The film exhibits the desired poor physical qualities in its final form yet the film can be processed and handled on conventional extruded film equipment and further converted to a label using conventional pressure sensitive coating and lamination processes.

While there has been described herein what is believed to be the preferred embodiments of the present invention, those skilled in the art will recognize that changes and modifications may be made thereto without departing from the spirit of the invention, and it is intended to claim all such changes and modifications as fall within the true scope of the invention.

We claim:

1. A tamper-evident film suitable for use in forming a tamper-evident pressure sensitive label having less cohesive strength than the adhesive strength of an adhesive material bonded to one surface of the tamper-evident film, the tamper-evident film having been made by a process comprising the steps of extruding a mixture comprising an incompatible blend consisting of
   (a) about 40% to about 70%, by weight, of a first polymer consisting essentially of at least one readily extrudable polyolefin; and
   (b) about 30% to about 60%, by weight, of a second polymer consisting essentially of a brittle polymer selected from the group consisting of polystyrene, polymethylmethacrylate, or blends thereof; through a die in the form of a film, and continuously extruding a suitable length of film and withdrawing the tamper-evident film such that the tamper-evident film is not broken; the film having physical properties which allow the film to be readily torn or destroyed in both the transverse and machine direction.

2. The film of claim 1, wherein the first polymer is polyethylene, polypropylene, copolymers of polyethylene, copolymers of polypropylene or blends thereof.

3. The film of claim 1, wherein the first polymer consists essentially of approximately 50% to about 70%, by weight, high density polyethylene and the second polymer consists of about 30% to about 50%, by weight, polystyrene.

4. The film of claim 1, wherein the film has a matte finish on a first surface and a smooth or glossy finish on a second surface.

5. The film of claim 1, wherein as the tamper-evident film is initially extruded from the die, a carrier film is used to lace the tamper-evident film through film extrusion equipment.

6. The film of claim 1, wherein, as the tamper-evident film is continuously extruded, lateral edges of the film are cut to form ribbons of the film which are removed at a constant tension without causing breakage of the film.

7. The film of claim 1, wherein, after a suitable length of the tamper-evident film is extruded and wound on a roll, reduced tension is placed on the film as a trailing edge of the film is being cut or indexed.

8. A tamper-evident film suitable for use in forming a tamper-evident pressure sensitive label having less cohesive strength than an adhesive material bonded to one surface of the tamper-evident film, the tamper-evident film having been made by a process comprising the steps of extruding a mixture comprising an incompatible resin blend consisting of (a) about 40% to about 70%, by weight, of a first polymer consisting essentially of at least one readily extrudable polyolefin; and (b) about 30% to about 60%, by weight, of a second polymer consisting essentially of a brittle polymer selected from the group consisting of polystyrene, polymethylmethacrylate, or blends thereof; through a die in the form of the tamper-evident film, wherein as the tamper-evident film is initially extruded from the die, a carrier film is used to lace the tamper-evident film through film extrusion equipment; and, continuously extruding a suitable length of film and withdrawing the tamper-evident film such that the tamper-evident film is not broken; the film having physical properties which allow the film to be readily torn or destroyed in both the transverse and machine direction.

9. The tamper-evident film of claim 8, wherein the first polymer is polyethylene, polypropylene, copolymers of polyethylene, copolymers of polypropylene or blends thereof.

10. The tamper-evident film of claim 8, wherein the first polymer consisting essentially of about 50% to about 70%, by weight, high density polyethylene and the second polymer comprises about 30% to about 50%, by weight, polystyrene.

11. The tamper-evident film of claim 8, wherein the tamper-evident film has a matte finish on a first surface and a smooth or glossy finish on a second surface.

12. The tamper-evident film of claim 8, wherein the process further comprises cutting lateral edges or ribbons of film from the film as the tamper-evident film is continuously extruded, and removing the ribbons of the tamper-evident film at a constant tension whereby the tamper-evident film is continuously extruded without causing breakage of the tamper-evident film.

13. The tamper-evident film of claim 8, wherein the process further comprises winding a suitable length of the tamper-evident film into a roll of film, and reducing tension on the tamper-evident film as a trailing edge of the film on the roll is being cut or indexed.

* * * * *